May 29, 1951 L. G. ERICKSON 2,554,778

FREQUENCY CHANGER

Filed June 24, 1949 2 Sheets-Sheet 1

INVENTOR.
LENNART G. ERICKSON.
BY Lippincott & Smith
ATTORNEYS.

INVENTOR.
LENNART G. ERICKSON.
BY
Lippincott + Smith
ATTORNEYS.

Patented May 29, 1951 2,554,778

UNITED STATES PATENT OFFICE 2,554,778

FREQUENCY CHANGER

Lennart G. Erickson, San Francisco, Calif., assignor to Lenkurt Electric Co., Inc., San Carlos, Calif., a corporation of Delaware Application June 24, 1949, Serial No. 100,997

6 Claims. (Cl. 332—47)

This invention relates to frequency changers—that is, modulators and demodulators—of the so-called "reversing switch" type, and while it is applicable to such modulators using mechanical switching systems, it is particularly adapted to modulators wherein the switching action is accomplished by nonlinear circuit elements acting as more or less perfect rectifiers.

Many circuits using the principles mentioned have been shown in the prior art, these circuits differing in greater or less degree in the manner in which the various potentials to be operated on are applied and in the frequencies to be delivered thereby. The circuit most generally used is the so-called "bridge" or "ring" modulator, wherein four rectifiers or groups of rectifiers are connected as the arms of a Wheatstone bridge. One input circuit is usually connected as one diagonal of the bridge, either a second input circuit or the output circuit is connected as the other diagonal, and the third circuit—either the output or the second input—connects the two diagonals. The three circuits mentioned are conjugate, in that any two may be interchanged without changing the function of the device.

When a circuit of the type mentioned is supplied with inputs of two sources, usually one of relatively high and the other of relatively low frequency, there will appear in the third circuit frequencies representing the sum and the difference of the frequencies supplied. In the most usual case one of the input frequencies is a voice frequency, and the other a high or carrier frequency if the device is to be used as a modulator; if it be used as a demodulator one of the supply frequencies is the sum or difference frequency from a modulator circuit, the other is the same carrier frequency as was supplied in modulation, and the useful frequency in the output circuit is the difference of the two which is equal to the original voice frequency. By slight modification of the circuits it is also possible to obtain in the output either or both of the input frequencies or multiples thereof.

As has been indicated many modifications have been shown of the circuits generally described above. Under certain circumstances it is desirable that the various branch circuits be electrically separate, and some of the modified circuits permit this. So far as I am aware, however, all of the frequency changers of this type are essentially electrical equivalents to the ring-connected rectifier arrangement that has been mentioned.

Considered broadly this invention comprises a reversal of past practice in that two of the conjugate circuits, each of which comprises a pair of equal coils, are connected as the primary ring or bridge circuit, the two coils of one input being oppositely poled and connected as opposite arms of the bridge. The reversing elements, usually rectifiers, are included in the diagonal arms of the bridge, while the third conjugate circuit is connected, as before, between the two diagonals.

Among the objects and advantages of this arrangement are to provide a modulator or demodulator wherein the insertion loss is that of a single transformer instead of two transformers; to provide a frequency changer which can be accurately balanced but which uses simple three winding transformers only, instead of the more complicated types frequently required to obtain the same results by other methods; to provide a frequency changer wherein one of the input transformers can be a transformer used in the carrier oscillator itself, thus avoiding at least one relatively expensive circuit element in each modulator or demodulator; to provide a double balanced modulator or demodulator which employs only two rectifiers instead of the customary four; and, in general, to provide a broadly new type of modulator circuit which is simple to construct, utilizes relatively inexpensive elements, can be constructed to offer an accurate impedance match to each of the conjugate circuits to which it is connected, and, through slight modifications, can be adapted to either single or double sideband transmission and to carrier suppression or transmission as may be desired.

The invention will be better understood by reference to the following detailed description taken in connection with the accompanying drawings, wherein.

Figure 5:
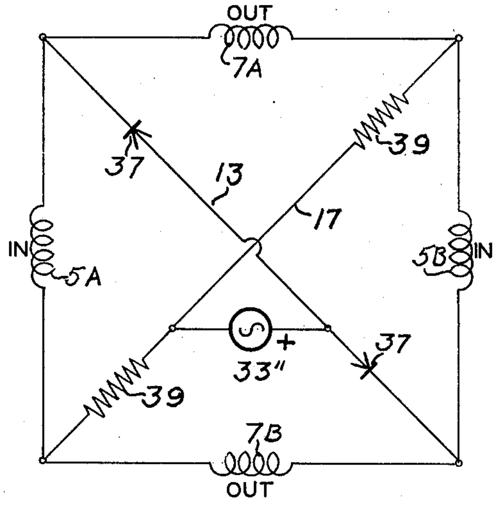
Fig. 5 is a diagram of the simplified type illustrating the invention as used in a balanced modulator employing only two rectifiers.
Figure 6:
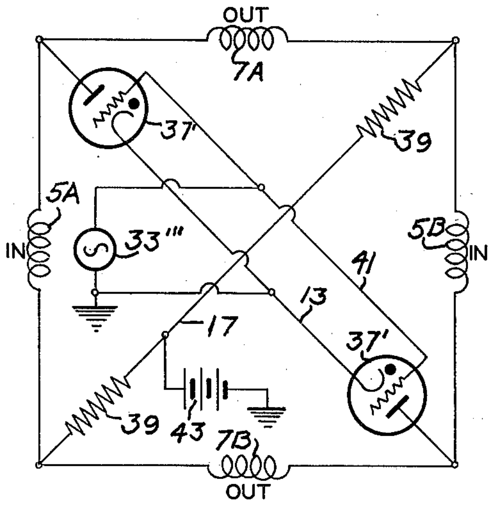
Figure 7:
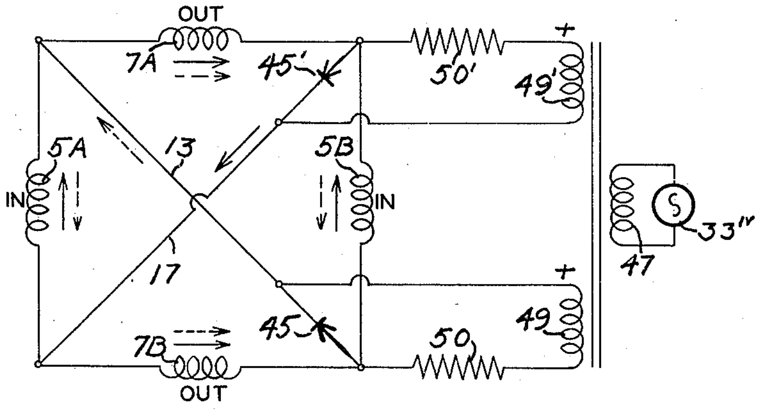

Fig. 6 is a modification of the circuit of Fig. 5, employing grid control tubes as switches instead of dry contact type rectifiers or diodes; and Fig. 7 is a diagram of the simplified type illustrating an unbalanced modulator utilizing two rectifiers only but wherein, although unbalanced, the modulation products are distributed between the various circuits in such manner that no carrier appears in the output.

Figure 1:
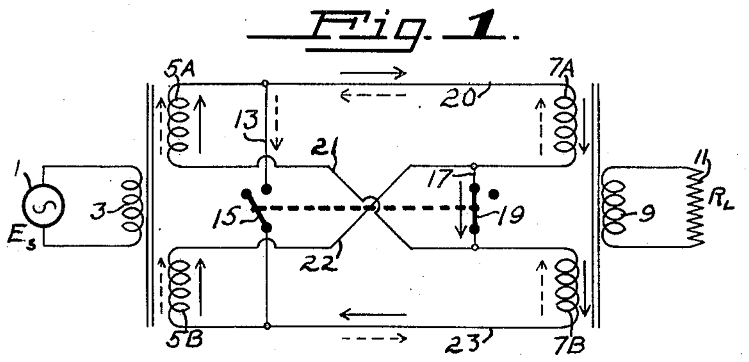
Fig. 1 is a diagram of the basic circuit, illustrating a source of input signal, input and output transformers, and load, the reversing switches for accomplishing modulation being indicated as mechanical.

Considering first the fundamental circuit as shown in Fig. 1, a source 1 of signal voltage $E_s$ connects to the primary 3 of a transformer having two equal and separate secondary windings 5A and 5B. An output transformer, preferably identical with the transformer just described, has two input windings 7A and 7B magnetically coupled to a single secondary winding 9 which feeds a load 11 having an impedance $R_L$. The windings 5A, 7A, 5B and 7B are connected in series and in that order, the winding 7B connecting back to the other end of winding 5A, the connections being such that, considered in the order given around the circuit, the two input windings 5A and 5B are oppositely poled so that no resultant current will flow in the circuit. This ring connection is fundamental to the invention, and appears in all of the diagrams, using the same reference characters to distinguish the parts.

In addition to the ring connection just described, two additional cross connections are provided, each including a switch. The first of these cross connections 13 is adapted to complete a circuit between the top of coils 5A and 7A and the bottom of coils 5B and 7B when the included switch 15 is closed. The second connection 17 connects the bottom ends of coils 5A and 7A with the tops of coils 5B and 7B when switch 19 is closed. The switches 15 and 19 are shown as mechanically interconnected, so that they cannot be closed simultaneously. The diagonal connections are also common to all of the drawings and retain the same reference characters throughout.

The arrows on Fig. 1 show the conditions of current flow in the circuit at an instant when the upper terminals of coils 5A and 5B are positive, and for the two conditions of the switches 15 and 19. Solid arrows indicate the conditions when switch 19 is closed, as is shown by the solid line in the figure. The current then may be considered as flowing from the top of coil 5A through lead 20 to the top of coil 7A, thence down through the coil and switch 19 and back through lead 21 to the bottom of coil 5A. Similarly, current from the top of coil 5B flows through lead 22 to switch 19, down through the switch and coil 7B and back through lead 23 to the bottom of coil 5B. It is to be noted, however, that the current flow can also be described as if the two windings of the input and the output transformers, respectively, were straight series connected, with connected center taps. From this point of view the current flow would be traced from the top of coil 5A through lead 20, down through coil 7A, the switch 19, coil 7B, and lead 23, back to the bottom of coil 5B. From this point the current flows up through coil 5B, down again through switch 19 and back to the bottom of coil 5A and so to the beginning of the circuit. Which of these points of view is accepted is a matter of choice; for some purposes one view of the circuit makes the operation slightly clearer, and under other circumstances the other point of view may be preferable.

When the position of switches 15 and 19 is reversed (the top of coils 5A and 5B still being positive with respect to the signal voltage), the flow, following the dotted arrows, may be traced from the top of coil 5A down through lead 13 and switch 15 to lead 23 and the bottom of coil 7B, up through the latter coil and back to the bottom of coil 5A. From the top of coil 5B the current flow is through lead 22 and up through coil 7A, back through leads 20 and 13 and the switch 15 to the bottom of coil 5B. The series connected point of view is also tenable under this latter condition of the switches 15 and 19. Reversal of the signal potential will, of course, cause all directions of flow to be reversed.

It will be noted that the circuit conditions in the two switching positions are identical except that the direction of current flow in the output transformer coils is reversed. This is, of course, the condition for modulation.

Figure 2:
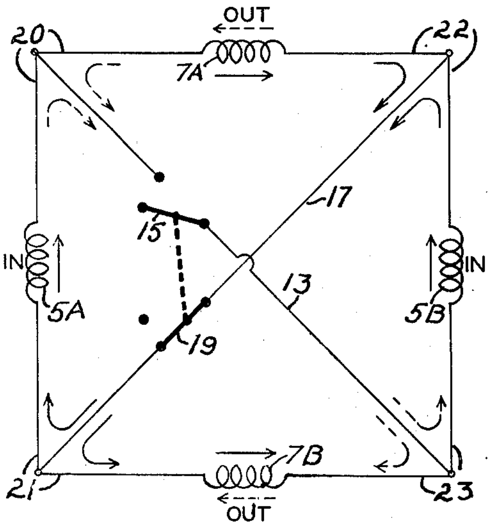
Fig. 2 is a redrawing of a portion of the circuit of Fig. 1, the actual input and output coils of the transformers being omitted.

Figure 2 is a partial redrawing of the elements shown in Figure 1, the signal generator and primary coil 3, however, being omitted and replaced by the legends "In," and the output coil 9 and load 11 also being omitted and replaced by the legends "Out." The purpose of Figure 2 is twofold; first, to bring out clearly the fact that the coils of the modulator circuit proper are connected in a bridge or a ring with the switch circuits 13 and 17 connected across the diagonals of the bridge, second, to serve as a prototype for later simplified diagrams illustrating various electrical methods of switching by means of rectifiers. The same reference characters are applied in Figure 2 as in Figure 1, and the arrows, solid and dotted, illustrate the current flows in the two switch positions in the same manner as in Figure 1.

Figure 3:
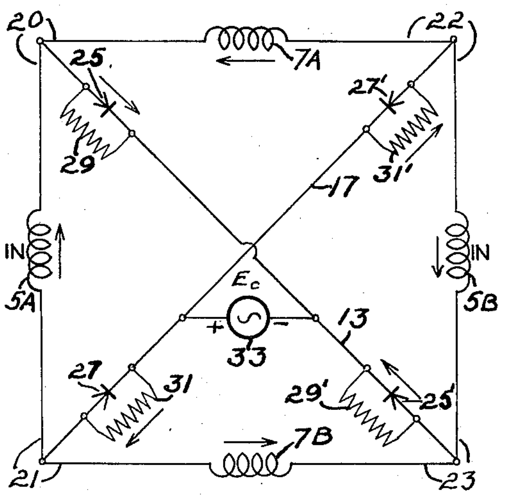
Fig. 3 is a simplified diagram of the same type as Fig. 2, illustrating the use of rectifier type switches and the connection of a carrier supply for operating the same.

Figure 3 shows one electrical method of switching. The coils 5A, 5B, 7A and 7B are connected as before, with the diagonals 13 and 17 connected to the junctions. In this case the switches 15 and 19 are replaced by rectifiers, one pair of oppositely poled rectifiers 25, 25′ being connected in the lead 13, and a second pair of oppositely poled rectifiers 27, 27′ being connected in lead 17. The rectifiers may be of any known type, such as copper oxide or other dry contact rectifiers, germanium crystal, or diodes or other types of vacuum or gas-filled tubes, as will later be discussed in detail. For the moment it will be assumed that these rectifiers are germanium crystals having a forward resistance of approximately 100 ohms and a back resistance of 100,000 ohms or more. Shunted around each of the rectifiers is a resistor of fairly high value, say 3000 ohms, rectifiers 25 and 25′ being shunted by resistors 29 and 29′ respectively, while rectifiers 27 and 27′ are shunted by resistors 31 and 31′. If the rectifiers used have lower back resistance the shunting resistors may be omitted.

A source of carrier potential 33 connects to the two diagonals 13 and 17 between the oppositely poled rectifiers. The arrows in this figure indicate the flow of carrier current of the polarity shown. The flow may be traced from the lead 17 outwardly through resistors 31 and 31′ to leads 21 and 22. Here the current divides, that flowing to lead 21 flowing upwardly through coil 5A and to the right through coil 7B while the current to lead 22 flows to the left through coil 7A and downwardly through coil 5B. The components of current flowing through coils 5A and 7A unite and flow inwardly through rectifier 25 to lead 13 and back to the source 33. Similarly the currents flowing through coils 5B and 7B unite in lead 23 and flow through rectifier 25' back to the source.

It will be noted that carrier current flows upwardly through coil 5A and downwardly through coil 5B, and to the right through coil 7B and to the left through coil 7A. If rectifiers 25 and 25' are balanced so that they offer substantially the same forward resistance the effect of the carrier in the output circuits is zero; i. e., the modulator (or demodulator) is balanced.

As long as the signal voltage as applied across the rectifiers is less, preferably materially less, than the carrier voltage the effect of the carrier is to "close" the rectifier switches, making the operation of the circuits substantially identical with that shown in Figure 2. There is, however, this difference: The resistors 31 and 31' are effectively connected in series across the opposite diagonal of the bridge. If the input and output circuits be considered from the "series point of view" mentioned above it becomes evident that these resistors are effectively shunted across the circuits, somewhat reducing the impedance of the circuit looking into the input transformer. The effect of the forward resistance of the rectifiers 25 and 25', which are effectively in series between the input and the output transformers, is, however, slightly to increase the impedance looking into the circuit. These effects are compensatory to a considerable degree, the combination forming in effect, a pad interposed in the circuit. The impedance match resulting is not bad if the transformer impedances are 600 ohms each, looking into the two windings 5A and 5B or 7A and 7B in parallel. A slightly better match can be obtained, however, by raising this impedance to about 750 ohms.

As is the case with more conventional types of frequency changers, the three external circuits, i. e., signal input, carrier input, and load, are conjugate, and it is immaterial insofar as the modulator itself is concerned which circuit is used for which purpose. The arrangements shown in the first three figures perhaps approach more nearly the conventional modulator circuits; there is, however, a definite advantage to be obtained by interchanging the carrier input and load circuits as they were described in Figure 3, and connecting them as is indicated in the more complete diagram of Figure 4.

Figure 4:
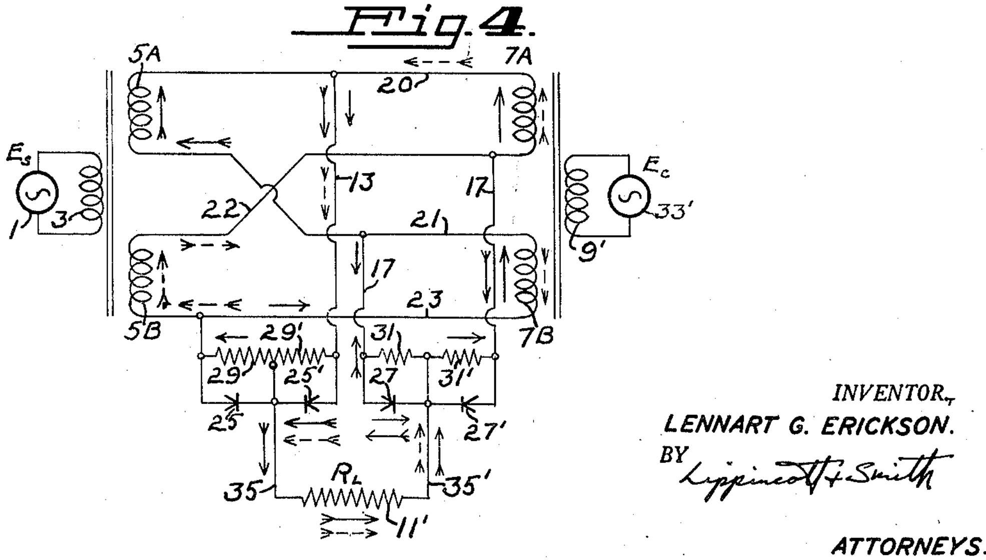
Fig. 4 is a diagram of the same general type as Fig. 1, showing complete input circuits, both carrier and signal, and load circuit, the circuit being essentially that shown in Fig. 3 but with carrier and load circuits interchanged.

The drawing of Figure 4 is of the same general type as Figure 1. The carrier source 33' is, however, connected to the coil 9', this transformer including coils 7A and 7B thereby becoming a second input transformer, and the load 11' is connected between the junctions of the rectifiers in the two diagonal circuits. With this connection the solid featherless arrows indicate the carrier current flow when positive potentials appear at the upper terminals of coils 7A and 7B. Tracing this flow from the top of coil 7A through lead 20 it proceeds down through lead 13, through rectifier 25' and bridging resistor 29, thence back through lead 23 and up through coil 7B, down through lead 17, rectifier 27, and resistor 31' and so back to the bottom of coil 7A. It will be noted that in this instance the "series" view of the circuit has been adopted as being most logical. It can be shown that both of the leads 35 and 35' conecting to the load 11' are of the same potential with respect to the carrier, and that the circuit is therefore balanced for this connection as well as that first described.

With the carrier flow as indicated by the plain arrows, the signal current flow will be as shown by the solid-line feathered arrows. Considering coil 5A, the flow is from the top of the coil, down through lead 13 and rectifier 25 to lead 35 and the load, thence back through the lead 35', through rectifier 27 and thence back to lead 17 and the bottom of coil 5A. There is no comparable direct circuit from coil 5B, since tracing from the top of the coil to rectifier 27 a closed circuit is met due to the opposing potential applied to this rectifier from the carrier source. Similarly, tracing from the lower end of the coil 5B, rectifier 25 is also closed and held so by the carrier potential. There is, however, an indirect path for the potentials from coil 5B, namely from the top of the coil up through coil 7A, down through lead 13 and thence through the same path as is offered to current from coil 5A through the load, back to lead 17 and down through coil 7B to lead 23 back to the bottom of coil 5B. This path is indicated by the dotted feathered arrows. Since the current passes through coils 7A and 7B in opposite directions it induces no signal potentials in the carrier input circuit. The resistance of coils 7A and 7B is in series in this path, and hence the contribution of coil 5B to the output is somewhat less than that of coil 5A. With respect to the ouput circuit, however, the paths are in parallel, and therefore the losses are slightly less than they would be if only the single coil 5A were used, and it is ordinarily convenient to design the transformers so that either coil 5A or 5B would be adequate to supply the load.

Upon reversal of the signal voltage the path would be the same but in the reverse direction. Reversal of the carrier voltage closes rectifiers 25 and 27' and opens rectifiers 25' and 27, thereby reversing the flow of current in the load. In view of the symmetrical nature of the circuit it is unnecessary to trace the current paths in this case.

The advantage of the circuit of Figure 4 is that it involves only one transformer between the signal source and the load, and the insertion loss of the second transformer is thereby avoided. The insertion loss due to the rectifier resistance is unavoidable in any modulator of this type, but the omission of the second transformer offers a distinct gain. The preferred transformation ratio of all transformers used in this circuit should be about 1:1 which, together with the impedance characteristics of the network comprising the active rectifiers and the effectively shunt-connected resistors, gives an effective impedance close to 600 ohms for the circuits associated with the signal frequency source and the carrier frequency line. These values are only approximate since the forward resistance of the rectifiers varies with the value of the carrier current.

Figure 5 is another modification of the basic circuit of this invention which illustrates the construction of a double balanced modulator utilizing only two rectifiers. The basic ring 5A, 5B, 7A and 7B is connected as before. In this case, however, two rectifiers 37 are connected back-to-back in the diagonal 13 without the shunting resistors, while two resistors 39, each of approximately 400 ohms value are connected in series in the diagonal 17. A carrier source 33'' connects the midpoints of the two diagonals.

In this case carrier current flows only when the right-hand terminal of carrier source is positive, the current dividing and flowing outwardly in each direction through the diagonal 13, then dividing again, flowing downwardly through coil 5A, and to the right through coil 7A and thence back through resistors 39 to the negative terminal of the source, and, in the other branch, flowing upwardly through coil 5B, and to the left through coil 7B to return to the carrier source. The flow being in opposite directions in coils 5A and 5B the carrier does not appear in the output. With the reversal of the carrier potential the diagonal 13 is effectively an open circuit and all current flow is through the diagonal 17 and the two series resistors 39. When the rectifiers 37 are carrying current, i. e., in the "closed circuit" state, they offer a series resistance of the order of 200 ohms, and the two resistors 39 in series are effectively shunted across the output.

This arrangement is not as efficient as those which have previously been described, and it does introduce some distortion owing to the changing impedances looking into the frequency changing circuit. Normally, however, the harmonic frequencies and undesired modulation products that are introduced are quite outside of the range of frequencies which includes the desired modulation products and therefore, because of the simplicity and cheapness of the circuit there are places where it may have considerable value.

Figure 6 illustrates an extension of the idea illustrated in Figure 5. The circuit differs from that of Figure 5 in that the vacuum tube rectifiers 37′ are substituted for the simple rectifiers 37 of Figure 5. The tubes 37′ are of the grid-control type, and may be either vacuum or gaseous-content tubes. The control grids of the two tubes are connected by a lead 41, and the carrier source 33‴ connects between the diagonal lead 13 and the lead 41. One side of the carrier supply is grounded, i. e., that side which connects to the cathodes of the grid-control tubes 37′. Plate supply for both tubes is provided by a battery or other source 43 connecting from the midpoint of the diagonal 17 to ground.

The circuit has the advantage of very low rectifier resistance if gas-content tubes are used, and is also characterized by the fact that carrier voltage itself is not injected into the modulator ring. In other respects the circuit is substantially similar to that of Figure 5.

Figure 7 illustrates the application of the fundamental idea of this invention to an unbalanced type of modulator employing but two rectifier units. In this case the rectifiers, 45 and 45′, are disposed respectively in the two diagonals 13 and 17. The carrier source $33^{IV}$ connects to the primary 47 of a three-winding transformer, one secondary coil 49 of which connects through a current-limiting resistor 50 across rectifier 45, while the other secondary 49′ connects through resistor 50′ across rectifier 45′. It will be noted that this connection is equivalent to connecting the coils 49 and 49′ across the diagonals of the bridge circuit. The coils are so poled with respect to the rectifiers that only one is in the current carrying condition at a time.

When the carrier polarity is as indicated in the figure the current flow from coil 49 is directly through rectifier 45. The voltage across this rectifier will be relatively low, owing to its low resistance, and the main current will therefore flow through it, the voltage being limited by the drop through resistor 50. There are two additional current paths from coil 49, that is, across the diagonal 13 and around the bridge in two directions and back to coil 49. Since with the values of external circuit impedance that have been considered previously each of these paths will offer a resistance of 2000 ohms or more in parallel with the approximately 100 ohm resistance of the rectifier when in this condition, this current flow is small enough so that it may be neglected in comparison with the flow from coil 49′, which is indicated by the solid arrows in the figure.

When the carrier potential reverses and rectifier 45 carries current, there will be a small flow from coil 49′ around the bridge as has previously been described with respect to coil 49. Coil 49 then provides the principal flow around the bridge, this flow being as indicated by the dotted arrows in the figure. It will be noted that while the current in the coils 5A and 5B has reversed in direction with the reversal of carrier polarity, the current in coils 7A and 7B is in the same direction, meaning that the latter coils carry a double-carrier frequency component while coils 5A and 5B carry a single-frequency component. Under certain circumstances this situation can be taken advantage of in separating the frequencies. When used as a modulator, for example, coils 5A and 5B may be used as voice frequency coils, and the circuits used at voice frequency will ordinarily reject the carrier, or, if they do not, filtering is relatively easy. The double carrier frequency can readily be separated from the modulated carrier, whereas the separation of these modulation frequencies from the carrier frequency itself would be more difficult. Where the circuit is used as a demodulator coils 7A and 7B may be used as the input coils, and like conditions will obtain. In this case, as in the others discussed, the carrier voltage applied to the non-conducting rectifier must be at least as high as the peak voltage of the modulating potential across the two input coils in series. The voltage across the conducting rectifier will drop to a value far below this owing to the presence of the current limiting resistors 50 and 50′. Contribution to both the single and double carrier frequencies from this source is therefore extremely small.

Various other arrangements of non-linear elements are possible in connection with the basic circuit. As in the case of modulators of conventional type it is not necessary that these non-linear elements be "perfect" rectifiers, although in general the sharper the break in the characteristic curve of the device the better the results will be. The specific devices used in the cases here described in detail and the connections in the diagonal circuits are therefore not to be considered as limiting, but merely illustrative of the broad invention as defined in the following claims.

What is claimed is:

1. A switch type frequency changing circuit comprising a pair of balanced input coils and a second pair of balanced coils connected as a bridge circuit, said input coils comprising opposite branches of said circuit and being oppositely poled with respect to the circuit around said bridge, circuits connected across the diagonals of said bridge circuit, current rectifying means in at least one of said diagonal circuits and an external circuit effectively connected between said diagonal circuits.

2. A frequency changer in accordance with claim 1 wherein said rectifying means includes a pair of oppositely poled rectifiers in one of said diagonal circuits and comprising a pair of resistors connected in the other of said diagonal circuits, said external circuit being connected between the junctions of said rectifiers and said resistors respectively.

3. A frequency changer in accordance with claim 1 wherein said rectifying means includes a pair of oppositely poled rectifiers in each of said diagonal circuits and a resistor having a value high in comparison with the forward impedance of said rectifiers connected across each rectifier, said external circuit being connected between the junctions of the rectifiers in the respective diagonal circuits.

4. A frequency changing circuit in accordance with claim 1 wherein said rectifying means includes a pair of grid controlled tubes connected in oppositely poled relation in one of said diagonal circuits and said external circuit connects from the other diagonal circuit to the grids of said tubes.

5. A switch type frequency changing circuit comprising two pairs of balanced input coils connected as a bridge circuit, the coils of each pair comprising opposite branches of the bridge circuit and being oppositely poled with respect to the circuit around said bridge circuit, a pair of circuits connected across the diagonals of said bridge circuit, switching means actuated from one of said pairs of input coils connected in each of said diagonal circuits, and an output circuit connected between said diagonal circuits and fed through said switching means.

6. A frequency changing circuit in accordance with claim 5 wherein said switching means comprises a pair of oppositely poled rectifiers connected in each of said diagonal circuits and a resistor shunted around each of said rectifiers, said output circuit being connected between said rectifiers.

LENNART G. ERICKSON.

REFERENCES CITED

The following references are of record in the file of this patent:

UNITED STATES PATENTS

| Number | Name | Date |
|---|---|---|
| 2,144,655 | Hahnle | Jan. 24, 1939 |
| 2,462,093 | Grimes | Feb. 22, 1949 |